United States Patent
Mauseth et al.

(10) Patent No.: US 10,586,163 B1
(45) Date of Patent: Mar. 10, 2020

(54) GEOGRAPHIC LOCALE MAPPING SYSTEM FOR OUTCOME PREDICTION

(71) Applicant: MMSR, LLC, Denver, CO (US)

(72) Inventors: Michael J. Mauseth, Denver, CO (US); Steve Roe, Greenwood Village, CO (US); Jason Sweezey, Centennial, CO (US)

(73) Assignee: MMSR, LLC, Denver, CO (US)

( * ) Notice: Subject to any disclaimer, the term of this patent is extended or adjusted under 35 U.S.C. 154(b) by 642 days.

(21) Appl. No.: 15/291,632

(22) Filed: Oct. 12, 2016

Related U.S. Application Data

(63) Continuation-in-part of application No. 14/729,378, filed on Jun. 3, 2015, now Pat. No. 10,332,223.

(60) Provisional application No. 62/008,977, filed on Jun. 6, 2014.

(51) Int. Cl.
    *G06N 7/00*     (2006.01)
    *G06F 16/29*     (2019.01)
    *G06F 16/28*     (2019.01)

(52) U.S. Cl.
    CPC .......... *G06N 7/005* (2013.01); *G06F 16/285* (2019.01); *G06F 16/29* (2019.01)

(58) Field of Classification Search
    CPC .................................................... G06N 7/005
    See application file for complete search history.

(56) References Cited

U.S. PATENT DOCUMENTS

| | | | |
|---|---|---|---|
| 6,691,114 B1 | 2/2004 | Nakamura | |
| 7,050,990 B1 | 5/2006 | Chu et al. | |
| 8,015,196 B2 | 9/2011 | Taranenko et al. | |
| 8,364,689 B2 | 1/2013 | Hao | |
| 8,583,562 B1 | 11/2013 | McDaniel et al. | |
| 8,732,219 B1 | 5/2014 | Ferries et al. | |
| 9,753,945 B2 | 9/2017 | Jurca | |
| 2010/0063829 A1* | 3/2010 | Dupray | G06Q 30/0603 705/313 |
| 2012/0330715 A1* | 12/2012 | Malaviya | G06Q 30/02 705/7.29 |
| 2014/0279757 A1 | 9/2014 | Shimanovsky et al. | |
| 2015/0026181 A1* | 1/2015 | Milton | G06Q 30/0269 707/737 |

OTHER PUBLICATIONS

Search Apartments and Homes—Rent.com; http://www.rent.com, 2. pages.
Citymaps—https://citymaps.com, 3, pages.
(Continued)

*Primary Examiner* — Kurtis Gills
(74) *Attorney, Agent, or Firm* — Holzer Patel Drennan

(57) ABSTRACT

When applied to geographical locale datasets, cluster characterization and comparison techniques meaningfully transform representations of data to facilitate sophisticated locale-specific comparisons and provide location-specific outcome predictions. Outcome predictions may, for example, be based on distributions of locale attributes associated with of a large number of geographic locales and/or by computing statistical probabilities of particular outcomes based on outcome data associated with each of the geographic locales.

11 Claims, 12 Drawing Sheets

(56) References Cited

OTHER PUBLICATIONS

Heatmaps—New and Improved; https://www.zillow.com/blog/heatmaps-new-and-improved-3898, 4 pages.
Houses for Rent—Find Rental Homes, Apartments, Condos, Lofts at Rentals.com, https://www.rentals.com/, 4 pages.
'Match score' app puts Zillow on steriods | Inman—http://www.inman.com, 4 pages.

\* cited by examiner

| Locale Attribute | Attribute Category | Description |
|---|---|---|
| X2012_1114 | Business Type | % BUS Type in that neighborhood |
| P_pop_MEY12 | Demographic | % Population in age group old |
| P_HH_pworkerY12 | Economic | %Households with # of workers |
| P_renterocc | Housing | %Renter occupied Housing Units & ownership cost >+x% |
| P_pop_education | Social | %Population with certain level of education |

FIG. 6

Locale Attribute Values of Example Cluster Type ("Cluster-2")

| Type | Metrics | Cluster-2 | Total |
|---|---|---|---|
| Demographic | %Population in age group old | 62% ⇩ | 71% |
| Economic | % Households with # of workers | 12% | 7% |
| Housing | %Renter occupied Housing Units & ownership cost >=x% | 27% | 28% |
| Business | %BUS type in that neighborhood | 0.44% ⇧ | 0.19% |
| Great School | %Population with certain level of education | 8% ⇩ | 16% |

GEOGRAPHIC LOCALE MAPPING SYSTEM FOR OUTCOME PREDICTION

CROSS-REFERENCE TO RELATED APPLICATIONS

The present application is a continuation-in-part of pending U.S. patent application Ser. No. 14/729,378, entitled "Geographic Locale Mapping System" and filed on Jun. 3, 2015, which claims benefit of priority to U.S. Provisional Application No. 62/008,977, entitled "Locale Characterization and Comparison," and filed on Jun. 6, 2014. Both of these applications are specifically incorporated by reference for all that they disclose or teach.

BACKGROUND

The Internet provides a number of useful tools for individuals researching geographical locales in unfamiliar locations. For example, a user may be able to view various online listings or use a search engine to retrieve some information regarding population or housing demographics in a particular geographical area of interest. However, existing tools do not readily facilitate objective comparisons between different geographical locations.

SUMMARY

Implementations described and claimed herein provide for comparison of two or more geographic locales based on various locale attributes (e.g., demographics, property information, etc.), one or more user-specified criteria of interest, and/or other available user information. According to one implementation, a method for locale comparison includes defining a benchmark cluster for comparison to at least one locale cluster corresponding to a locale within a defined search zone. The locale cluster and the benchmark cluster correspond to different distributions of a set of locale attributes. The method further comprises assessing a similarity metric for the benchmark cluster and the locale cluster; and outputting one or more of the locales corresponding to the identified locale clusters satisfying the similarity metric. In addition to assessing similarities between different locales, there herein described technology can be used as a platform for outcome prediction in different locales, such as to predict the likelihood of an outcome of interest occurring in one locale based on an observation of the locale of interest in another locale.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 6 illustrates exemplary predictive locale attributes that may be useful in locale characterization and/or comparison.

Figure 11:
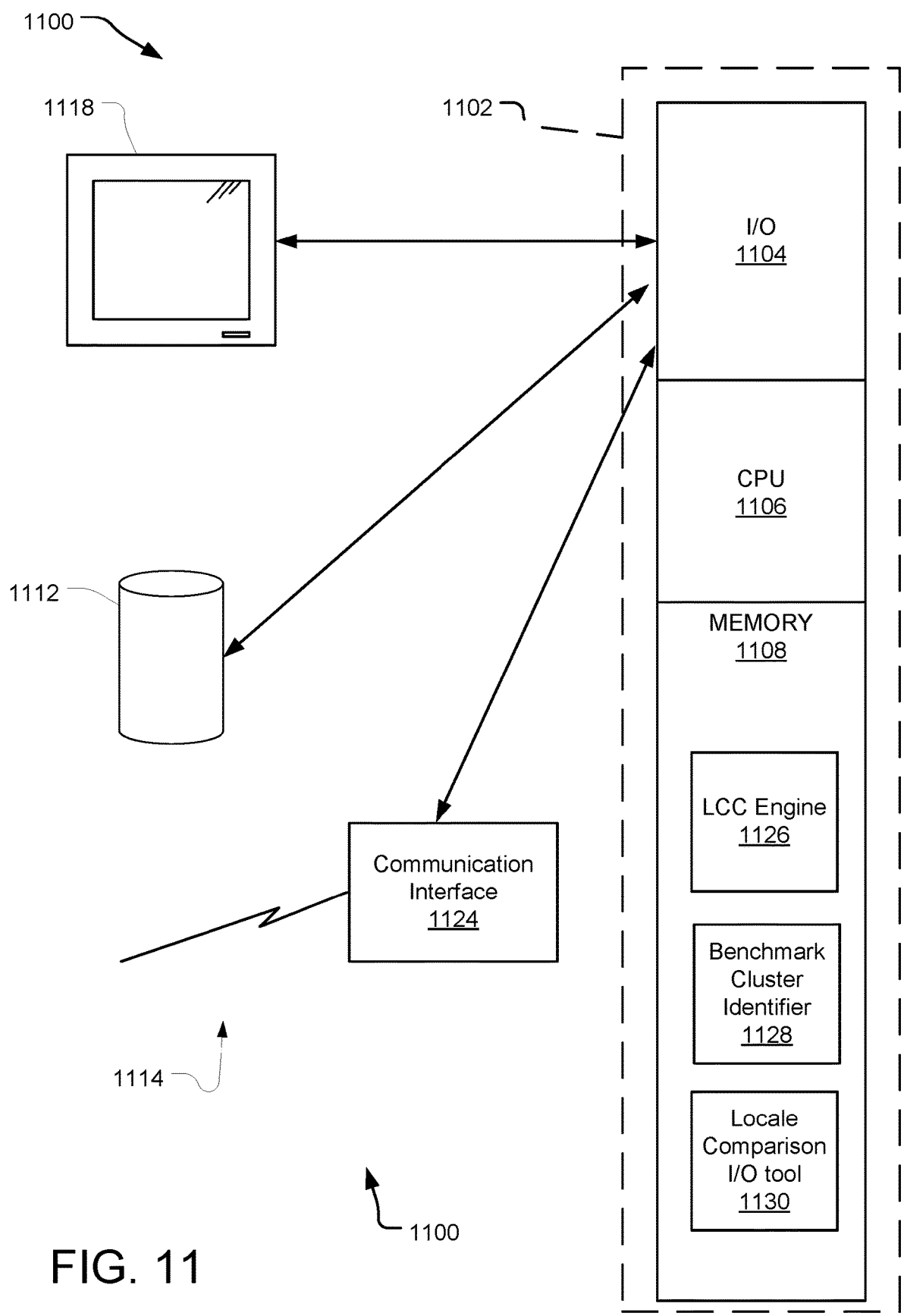

FIG. 11 discloses a block diagram of a computer system suitable for implementing one or more aspects of a system for locale characterization and comparison.

DETAILED DESCRIPTION

In some situations, potential real estate investors (e.g., renters, home-buyers, etc.) may expend considerable time and effort trying to learn about a "feel" or experience offered by a particular locale, such as a neighborhood or community. Comprehensive information about a given area is not readily accessible from any single source and may be difficult for an individual to seek out and compile in a meaningful way.

When an individual visits or moves to an unfamiliar locale, that individual may spend hours researching neighborhoods or area characteristics online, soliciting advice from friends or other individuals (e.g., real estate brokers) familiar with the area and/or physically visiting the different locales. A diverse number of user interests, priorities, and life circumstances may dictate which types of locale attributes are important in any given real estate query. For example, a recent college graduate moving across the country for a new job may seek an apartment rental in a dog-friendly area within walking distance of jogging paths with a high percentage of other single college graduates and an active nightlife scene. Other real estate inquiries may be deeply rooted in a certain type of "feel" or experience and less by tangible criteria (e.g., dog-friendly, active nightlife, etc.). For example, an individual moving across the country may want to find a place with a similar "feel" to the town where he or she grew up or went to college. Other inquiries may be influenced by an extensive variety of other demographics such as gender, race, age, income, property values, geographic information (e.g., parks, age of trees, bike lanes, etc.), climate data, educational opportunities, local exhibitions for music and the arts, etc.

Various implementations of the herein disclosed technology facilitate objective assessments of and/or comparisons between different locales based on a variety of statistical comparisons between different locale attributes. Such attributes may be represented, for example, as multi-dimensional clusters with attribute distributions stored as datasets in one or more public and/or private databases. As used herein, a "locale" refers to a geographical location generally including multiple residences, such as an apartment building, housing development, neighborhood, town, county, etc. Although the disclosed technology is discussed primarily with respect to web-based services related to real estate and property assessment, a variety of other applications are also contemplated including without limitation commercial data collection (e.g., franchise placement, venue determinations, etc.) and general user interest (e.g., comparing various locales as a matter of interest).

Figure 1:
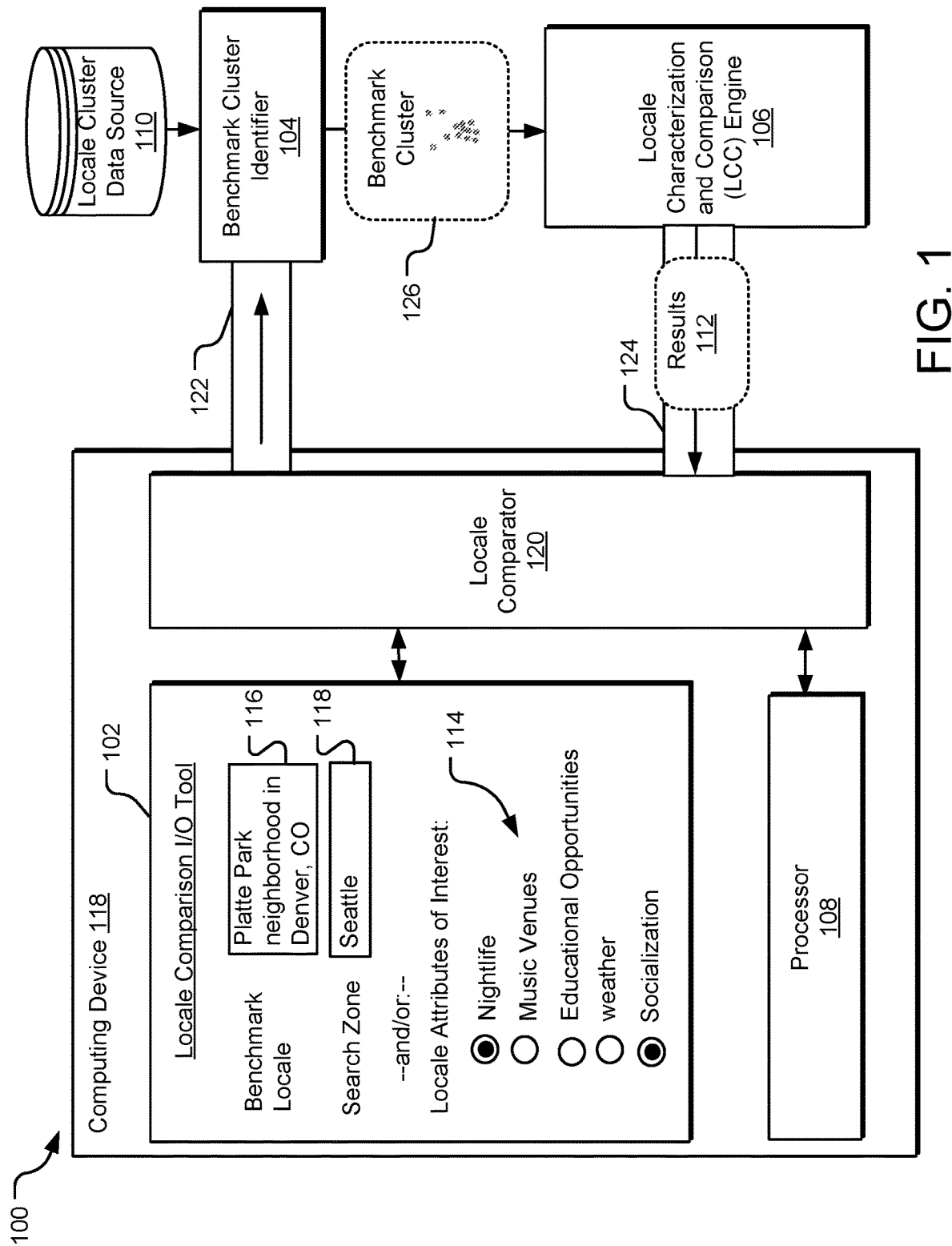
FIG. 1 illustrates an example system for locale characterization and comparison.

FIG. 1 illustrates one example system 100 for locale characterization and comparison. The system 100 includes a computing device 118 with a processor 108 for executing various applications and modules, such as a locale comparator 120. The locale comparator 120 is communicatively coupled via a number of data channels (e.g., data channels 122 and 124) to various modules that collectively facilitate objective characterization and/or comparison of different geographical locales. In particular, the locale comparator 120 is communicatively coupled to a benchmark cluster identifier 104 and a locale characterization and comparison (LCC) engine 106. The benchmark cluster identifier 104 and LCC engine 106 are shown external to the computing device 118; but may, in some implementations, be fully or partially integrated into software and/or hardware of the computing device 118.

In the system 100, the locale comparator 120 accepts user input by way of a local comparison I/O tool 102 (e.g., a graphical user interface) and provides such inputs to the benchmark cluster identifier 104 and/or LCC engine 106. Specific user inputs vary in different implementations; however, in FIG. 1, inputs to the locale comparison I/O tool include a benchmark locale 116 (e.g., Platte Park neighborhood in Denver, Colo.) and a search zone 118 (e.g., Seattle). The benchmark locale 116 is a geographical location corresponding to a particular distribution of locale attributes (not shown) that a user seeks to identify in association with another locale. In contrast, the search zone 118 identifies an area for the LCC engine 106 to search for locales similar to the benchmark locale 116. The search zone 118 may be, for example, a geographical area such as a country, state, county, city, or census block.

In the example of FIG. 1, the benchmark locale 116 (Platte Park neighborhood in Denver, Colo.) is not included within the search zone 118 (Seattle). This example may be pertinent when, for example, a user (not shown) is seeking to identify locales in an area of another state that he or she is unfamiliar with. In other implementations, the benchmark locale 116 is a region located within the search zone 118. For example, the benchmark locale 116 may be the Platte Park neighborhood in Denver, Colo., and the search zone 118 may be "Colorado." This example may be pertinent when, for example, a user is seeking other neighborhoods within Colorado that are similar to the Platte Park neighborhood in Denver. In still other implementations, the benchmark locale 116 is a state and the search zone 118 is a country. This example may be pertinent when, for example, the user 108 is seeking to identify one or more states similar to an identified "benchmark state" (e.g., the benchmark locale 116) in one or more respects. The above examples are meant to be non-exclusive. In various implementations, the benchmark locale 116 and search zone 118 may include areas of any size and/or location.

In the example of FIG. 1, a user provides inputs to the locale comparison I/O tool 102 to instruct the locale comparator 120 to search the city limits of Seattle for a locale having a distribution of locale attributes similar to the Platte Park neighborhood in Denver, Colo. The locale comparator 120 communicates the inputs of the locale comparison I/O tool 102 to the benchmark cluster identifier 104, and the benchmark cluster identifier 104 identifies a distribution of locale attributes exhibited by the benchmark locale 116. This distribution of locale attributes may, in different implementations, be represented by a variety of different metrics, and is herein referred to herein as a "benchmark cluster" (e.g., a benchmark cluster 126). One example of a benchmark cluster is a multi-dimensional array quantifying each of a number of locale attributes, such as one or more of population statistics based on age, race, gender, job type (e.g., white collar, blue collar), income data, property information, information on the local business market, educational opportunities, etc.

In FIG. 1, the benchmark cluster identifier 104 identifies (e.g., looks up, computes, or compiles) the benchmark cluster using one or a variety of data sources, such as a locale cluster data source 110. The benchmark cluster identifier 104 may also manipulate (e.g., normalize or weight) certain locale attributes to facilitate meaningful comparison to other distributions of locale attributes (e.g., other locales).

The benchmark cluster identifier 104 outputs the benchmark cluster 126 to the LCC engine 106, and the LCC engine 106 compares the benchmark cluster 126 to a number of other clusters, such as predefined clusters, dynamically computed clusters, etc., corresponding to other locales saved in a memory location. This comparison yields information (e.g., results 112) quantifying similarities and/or differences between the benchmark locale 116 and one or a number of locales within the search zone 118.

In different implementations, inputs to the locale comparison I/O tool 102 may vary. In one implementation, a user provides the locale comparison I/O tool 102 with locale attributes of interest 114 in lieu of the benchmark locale 116. In this case, the user may not define the benchmark locale 116. Rather, the benchmark cluster identifier 104 computes or selects the benchmark cluster based on the specified local attributes of interest 114. For example, the benchmark locale identifier 104 may compute or select a benchmark cluster from a number of pre-defined clusters, such as a cluster having higher values corresponding to the specified locale attributes of interest.

In yet another implementation, a user provides the locale comparison I/O 102 tool with locale attributes of interest 114 in addition to a benchmark locale 116, and the benchmark cluster identifier 104 assigns an increased weight to the specified locale attributes of interest 114 prior to selecting the benchmark cluster. If, for example, the user indicates that "nightlife" is a locale attribute of interest, the benchmark cluster identifier 104 assigns an increased weight to a locale attribute quantifying "nightlife" to influence the selection or computation of the corresponding benchmark cluster.

In another implementation, a user provides the locale comparison I/O 102 tool with an address and the benchmark cluster identifier 104 uses the address to identify the benchmark locale 116 and/or the benchmark cluster. For example, the user may supply his or her home address and the benchmark cluster identifier 104 may identify the benchmark cluster as a distribution of locale attributes defining the neighborhood that includes the specified address.

The results 112 output via the LCC engine 106 include one or more of the locales within the search zone 118 that have locale clusters similar to the benchmark cluster. For example, the results 112 may include a listing of the top five neighborhoods within the search zone 118 (e.g., Seattle) with associated distributions of locale attributes most similar to the benchmark cluster for the benchmark locale 116 (e.g., the Platte Park neighborhood in Denver, Colo.). In some implementations, the results 112 also include a summary of one or more locale clusters corresponding to the locales within the search zone 118 and/or the benchmark locale 116. For example, the summary may indicate that a particular locale has demographics and property values similar to the benchmark locale 116 (e.g., racial demographics, age demographics, etc.), but different social scenes (e.g., a variety of art complexes and music venues v. few art complexes or music venues).

Various modules and components of FIG. 1, such as the benchmark cluster identifier 104, the LCC engine 106, the locale comparator 120 and/or the locale comparison I/O tool 102 may be embodied in software and/or hardware of an article of manufacture, such as one or more tangible computer-readable storage media. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. Both the benchmark cluster identifier 104 and the LCC engine 106 may be executed and controlled by a processor (not shown), such as a processor residing on a host device communicatively coupled to a storage media that embodies the LCC engine 106.

Figure 2:
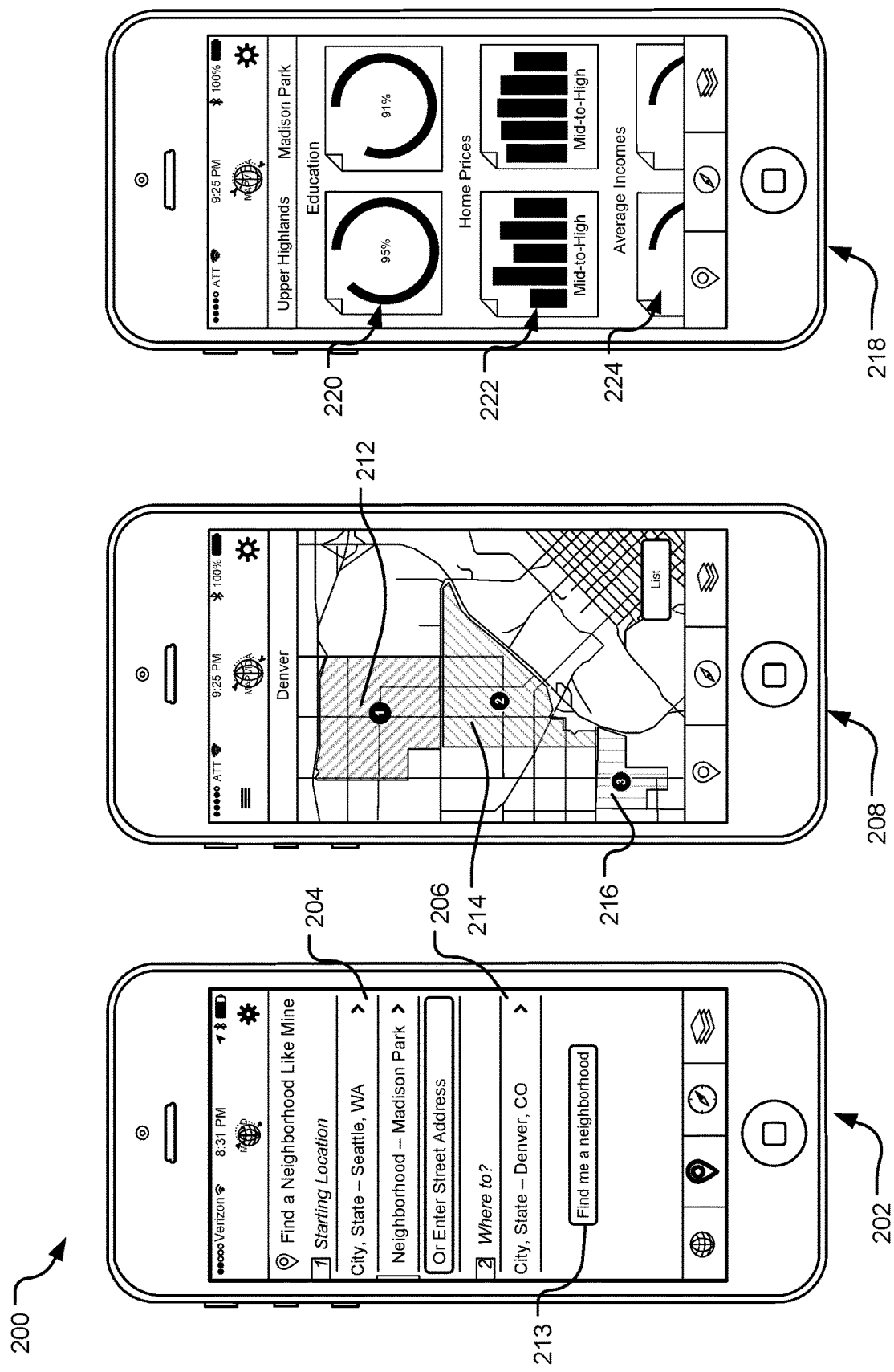
FIG. 2A illustrates a user input screen of another example system for locale characterization and comparison.
FIG. 2B illustrates an interactive map screen of the example system for locale characterization and comparison of FIG. 2A
FIG. 2C illustrates a locale comparison screen of the example system for locale characterization and comparison of FIGS. 2A and 2B.

FIGS. 2A, 2B and 2C illustrate different screens of a user interface presented by an example system for locale characterization and comparison 200. In particular, FIG. 2A illustrates a user input screen 202; FIG. 2B illustrates an interactive map screen 208; and FIG. 2C illustrates a locale comparison screen 218. The various screens of the user interface 200 may be displayable on any one or more of a variety of different types of electronic devices capable of accepting user input and transmitting data such as, for example, a smart phone, tablet, desktop or laptop computer, etc. User input may be provided differently in different implementations, such as by key or touchpad input, mouse input, voice dictation input, etc.

The user input screen 202 provides the system for locale characterization and comparison with two separate inputs: (1) a search zone 206 and (2) a benchmark locale 204. In the illustrated example, a user selects "Denver, Colo." for the search zone 206 and sets the benchmark locale 204 to "Madison Park" in "Seattle, Wash." The user initiates a query and comparison search by clicking an input submission button 213, which sends the inputs to other system modules, such as the benchmark cluster identifier and the LCC engine shown and described with respect to FIG. 1.

Responsive to receipt of the user input via the user input screen 202, the system for locale characterization and comparison 200 presents the user with the interactive map screen 208. The interactive map screen 208 illustrates a number of locales within the search zone 206 that the system for locale characterization and comparison 200 has identified as similar enough to the benchmark locale 204 to satisfy a pre-defined similarity metric. Similarity is based on a comparison of statistically significant locale attribute values and may assessed in a variety of suitable ways, some of which are discussed in greater detail below.

Although a number of suitable mathematical methods may be employed for locale comparison, similarity of locales is, in one implementation, assessed by comparing a benchmark cluster (e.g., a cluster representing the benchmark locale 204) to locale clusters representative of each of a number of different locales within the search zone 206. For example, each locale may be classified as a particular type of cluster defined by a distribution of locale attributes. Different clusters can be compared to one another by way of multi-dimensional cluster analysis. Cluster classification and analysis is discussed in greater detail below with respect to FIGS. 5-7.

The interactive map screen 208 of FIG. 2B illustrates three locales 212, 214 and 216 within the search zone of Denver, Colo. that have been identified as the "most similar" to the benchmark locale 204 of Madison Park in Seattle, Wash. in FIG. 2A. The interactive map screen 208 indicates geographical boundaries of each of the locales 212, 214, and 216, and also enumerates the three locales 212, 214, and 216 in order of decreasing similarity to the benchmark locale 204 (e.g., 1, 2, and 3 in FIG. 2B, where 1 indicates a greatest similarity level to the benchmark locale 204). In some implementations, a user can acquire further comparison information regarding each of the similar locales by touching, clicking, or otherwise selecting any one of the locales 212, 214, or 216 returned in response to the user query. For example, FIG. 2C illustrates an example locale comparison screen 218 presented to the user responsive to the user's selection of the locale 212 on the interactive map 208. The comparison screen 218 presents, in a side-by-side format, exemplary locale attribute data of the selected locale 212 (e.g., the Upper Highlands) and also the benchmark locale 204 (e.g., Madison Park).

More specifically, the locale comparison screen 218 in FIG. 2C presents graphics that compare the following categories of locale attributes: education, home prices, and average incomes of residents. As shown by the first set of plots 220, a comparison of education-related locale attributes indicates that the Upper Highlands and Madison Park offer similar educational opportunities. Likewise, a second set of plots 222 indicates that both the Upper Highlands and Madison Park offer comparable housing prices. Yet a third set of plots 224 (partially shown) illustrates similar average incomes for the two locales.

In some implementations, a user may be able to select any of the plots 220, 222, and 224 to be presented with further statistical information regarding each locale attribute or classification of locale attributes. For example, a user may select the second set of plots 222 and be directed to another screen that compares housing prices for different types of housing (e.g., purchase v. rental; commercial v. residential; and types of housing such as apartments, single family homes, etc.).

The above-described statistical analysis and system functionality facilitates a number of attribute-based comparisons at different levels of granularity (e.g., a general comparison based on a summary of all attributes (as in the interactive map screen 208 of FIG. 2B), a graphical comparison based on different categories of locale attribute values (as in the comparison screen 218 of FIG. 2C), and/or a comparison of individualized locale attribute values.

Figure 3:
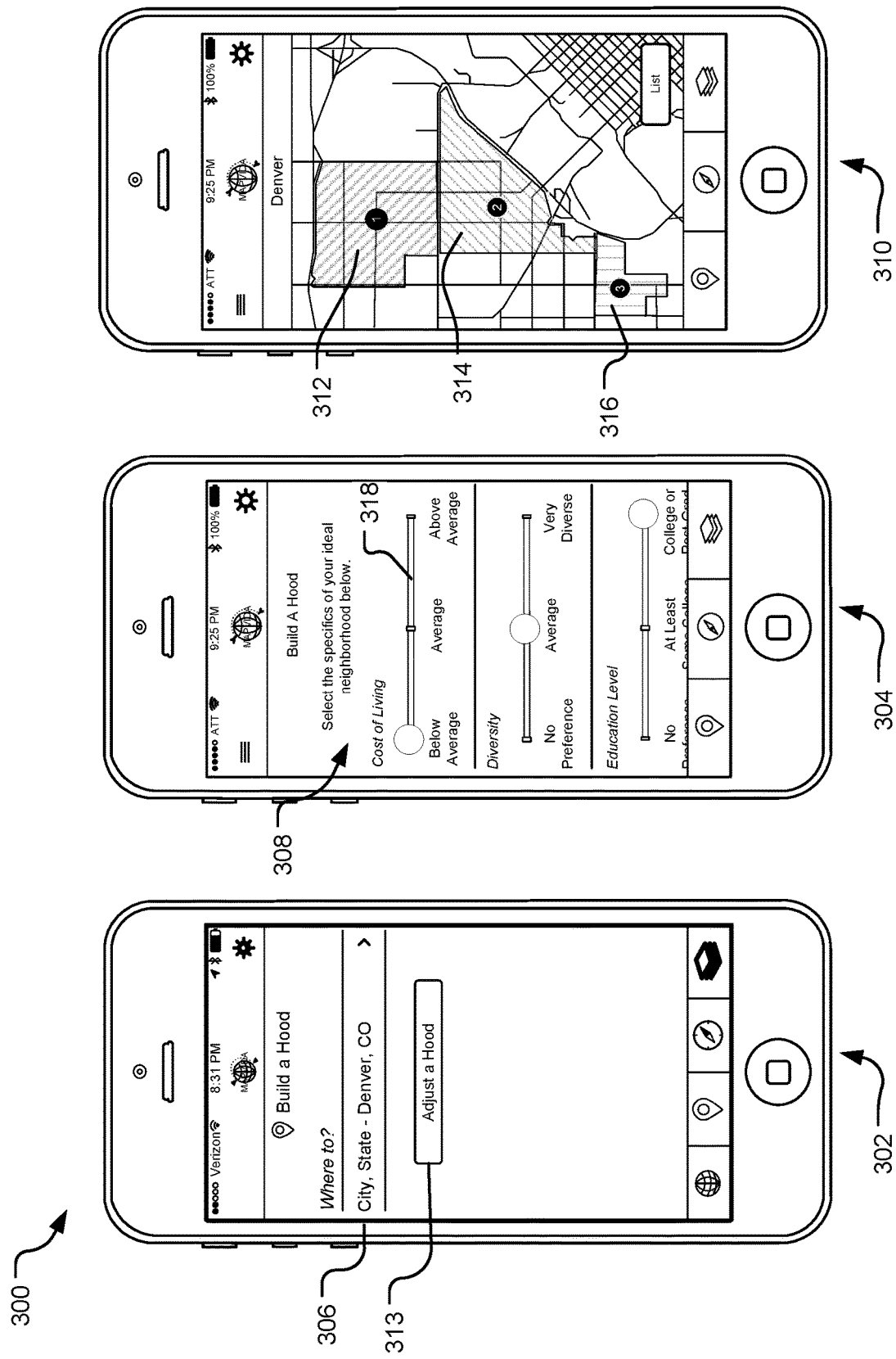
FIG. 3A illustrates a first input screen of another example system for locale characterization and comparison.
FIG. 3B illustrates a second input screen of the example system for locale characterization and comparison of FIG. 3A.
FIG. 3C illustrates an interactive map screen of the example system for locale characterization and comparison of FIGS. 3A and 3B.

FIGS. 3A, 3B, and 3C illustrate different screens of a user interface included in another example system for locale characterization and comparison 300 that allows a user to identify locales within a search zone 306 that satisfy a set of user-selectable criterion 308 (hereinafter, the criterion 308). More specifically, FIG. 3A illustrates a first input screen 302; FIG. 3B illustrates a second input screen 304; and FIG. 3C illustrates an interactive map output screen 310.

Using the first input screen 302 in FIG. 3A, a user specifies "Denver, Colo." as a search zone 306, indicating that he or she is interested in searching Denver, Colo. for locales satisfying a specified set of criteria. By clicking an input submission button 313, the user is directed to the second input screen 304 shown in FIG. 3B, which allows the user to specify a set of criterion 308 describing the "ideal" locale that the user seeks within the search zone 306. The criterion 308 is subsequently used to construct a benchmark cluster representing an "ideal" benchmark locale corresponding to a particular "benchmark" distribution of locale attributes. This benchmark cluster is, in turn, compared to other locale clusters associated with locales within the search zone (e.g., Denver, Colo.) to provide locale characterization and comparison information.

In FIG. 3B, the criterion 308 allows the user to customize locale attribute preferences to influence the locale search within the search zone 306 in FIG. 3A. For example, the second input screen 304 includes sliding scale tools (e.g., a sliding scale tool 318) to allow the user to select a preferred cost of living, diversity, and education level for his or her "ideal" locale within the search zone 306. In other implementations, the second input screen 304 allows a user to provide input relating to one or any other combination of other locale attributes. In different implementations, such input may be collected by a variety of tools via a number of different interface formats. In at least one implementation, the user clicks a radio button to supply a Boolean value indicating that a particular locale attribute is important (or not important) to the user.

The criterion 308 is used to weight different locale attributes or categories of locale attributes for a subsequent computation and/or selection of a benchmark cluster that is compared to other locale clusters associated with the search zone 306. If, for example, the user indicates that he or she prefers a "below average" cost of living, the system for locale characterization and comparison 300 may assign an increased weight to locale attributes quantifying availability of low-cost housing. Likewise, user input indicating a preference for a highly educated populous may cause the system for locale characterization and/or comparison 300 to assign an increased weight to one or more locale attributes relating to higher education.

In one implementation, the system for locale characterization and comparison 300 automatically selects some or all of the criterion 308 using available social media sources to identify various locale attributes of particular relevance to a current user. For example, the system for locale characterization and comparison 300 may access a user's social media information to determine that the user regularly purchases tickets to music concerts and enjoys fine dining. In this case, the criterion 308 may be automatically selected to indicate a preference for certain locale attributes such as "a high number of musical venues" and/or "a high number of fine dining restaurants." Social media information may be obtained, for example, by calling an API of a website and querying for text, or by parsing a feed of the social media website, such as an RSS feed.

Based on the criterion 308, the system for locale characterization and comparison 300 selects and/or weights different locale attributes and builds a benchmark cluster. The benchmark cluster is compared to locale clusters corresponding to a variety of locales within the search zone 306. When a comparison between the benchmark locale and a particular locale cluster satisfies a similarity metric, a locale associated with the locale cluster may be selected for output to the user in the interactive map screen 306.

FIG. 3C illustrates the interactive map screen 310 displaying query results provided by the system for locale characterization and comparison 300 responsive to a user query initiated via the inputs supplied in the first input screen 302 and the second input screen 304. The interactive map screen 310 indicates three locales 312, 314 and 316 within the search zone 306 (e.g., Denver) that are identified as having favorable locale attribute values based on the criterion 308 supplied by the user. In different implementations, the number of locales presented via the interactive map screen 310 may vary. For example, the user may be provided with a set number of locales (e.g., the top 5) or an otherwise limited number based on a satisfaction of a predetermined similarity metric.

FIGS. 4A, 4B, and 4C illustrate different screens of a user interface included in yet another example system for locale characterization and comparison 400. In particular, FIG. 4A illustrates an input screen 402; FIG. 4B illustrates an interactive mapping screen 408; and FIG. 4C illustrates a comparison screen 418. In one implementation, a user supplies the input screen 402 with two separate inputs: (1) a search zone 406 (e.g., Denver) and (2) a comparison region 410 (e.g., Seattle). By submitting the inputs via a user input submission button 413, the user initiates a locale characterization and comparison query that characterizes and compares each locale in the search zone 406 to a number of locales in the comparison region 410 based on associated distributions of locale attributes.

Responsive to receipt of the user input provided via the input screen 402 of FIG. 4A, the system of locale comparison and characterization 400 re-maps the entire search zone 406 according to similar locale attributes and presents the re-mapping to the user via the interactive mapping screen 408 of FIG. 4B. This mapping translates the entire search zone, re-labeling individual locales (e.g., neighborhoods) using graphical distinctions, such as different colors or shading, to illustrate locales within the search zone having similar locale attributes. In addition, the mapping screen 408 labels each locale within the search zone 406 (e.g., Denver) with a label identifying a similar (e.g., similarly classified)

locale in the comparison region 410 (e.g., Seattle, Wash.). For example, a neighborhood 414 representative of a Denver neighborhood "Stapleton" is labeled "Beacon Hill" to indicate that the Stapleton neighborhood in Denver satisfies a similarity metric with the Beacon Hill neighborhood in Seattle. In effect, the interactive mapping screen 408 of FIG. 4B allows the user to compare locales within the search zone to one another and also to a number of locales within the comparison region 410.

In one implementation, the above-described locale comparison is based on a classification assigned to each individual locale within the search zone 406 and also within the comparison region 410. For example, each neighborhood within the cities of Denver and Seattle may be classified as one of a set number of predefined cluster types. For example, the neighborhood of "Stapleton" in Denver, Colo. may be classified as a first cluster type ("Cluster 1") if Stapleton has a distribution of locale attribute values that satisfies a similarity metric when compared to a benchmark distribution defined by the cluster type (e.g., "Cluster 1"). Example locale classifications according to predefined cluster types is described in greater detail with respect to FIG. 5.

Figure 4:
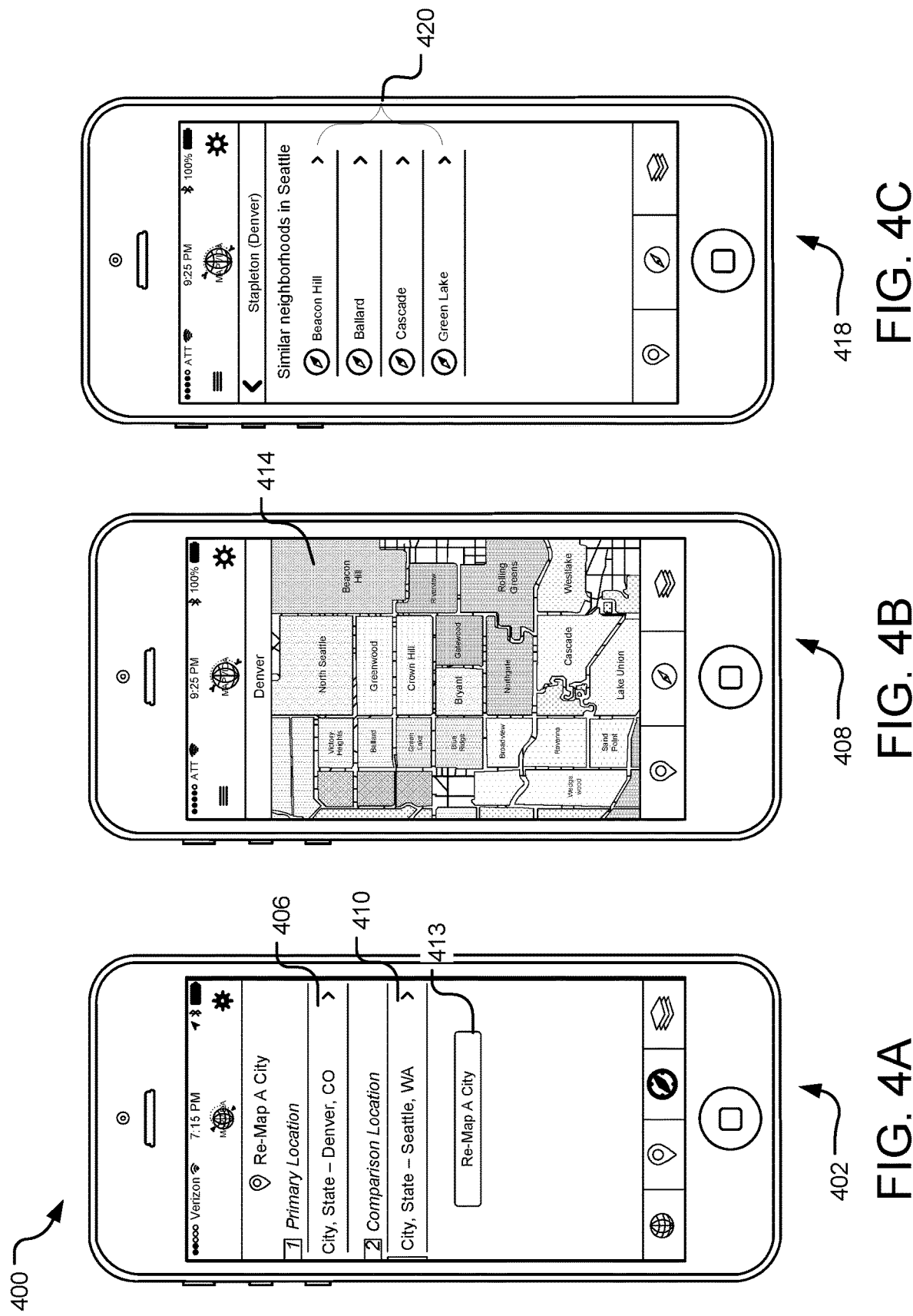
FIG. 4A illustrates an input screen of yet another example system for locale characterization and comparison.
FIG. 4B illustrates an interactive mapping screen of the example system for locale characterization and comparison of FIG. 4A.
FIG. 4C illustrates a locale comparison screen of the example system for locale characterization and comparison of FIGS. 4A and 4B.

The implementation of FIG. 4 further allows the user to select any of the illustrated locales in the interactive mapping screen 408 of FIG. 4B to compare the selected individual locale with a listing of one or more familiar locales within the initially-specified comparison region 410 (e.g., Seattle).

For example, the comparison screen 418 of FIG. 4C provides the user with a list of locales within the comparison region 410 (e.g., familiar locales 420) that satisfy a similarity metric with a particular selected locale from the interactive mapping screen 408. In the illustrated example, the user selects a suburb 414 from within the search zone 406 (Denver, Colo.) and is presented with a list of familiar locales 420 within the comparison region 410 (Seattle, Wash.). The suburb 414 represents the neighborhood of Stapleton in Denver, Colo. and is labeled "Beacon Hill" because the system 400 has identified Stapleton as "most similar" to Beacon Hill in Seattle, Colo. By selecting the suburb 414, the user can see that the Seattle neighborhoods of Beacon Hill, Ballard, Cascade, and Green Lake are identified by the system as similar to the Stapleton neighborhood in Denver. In one implementation, the familiar locales 420 presented in the comparison screen 418 are similarly or identically classified by the cluster analysis methodology described in greater detail with respect to FIG. 5.

Figure 5:
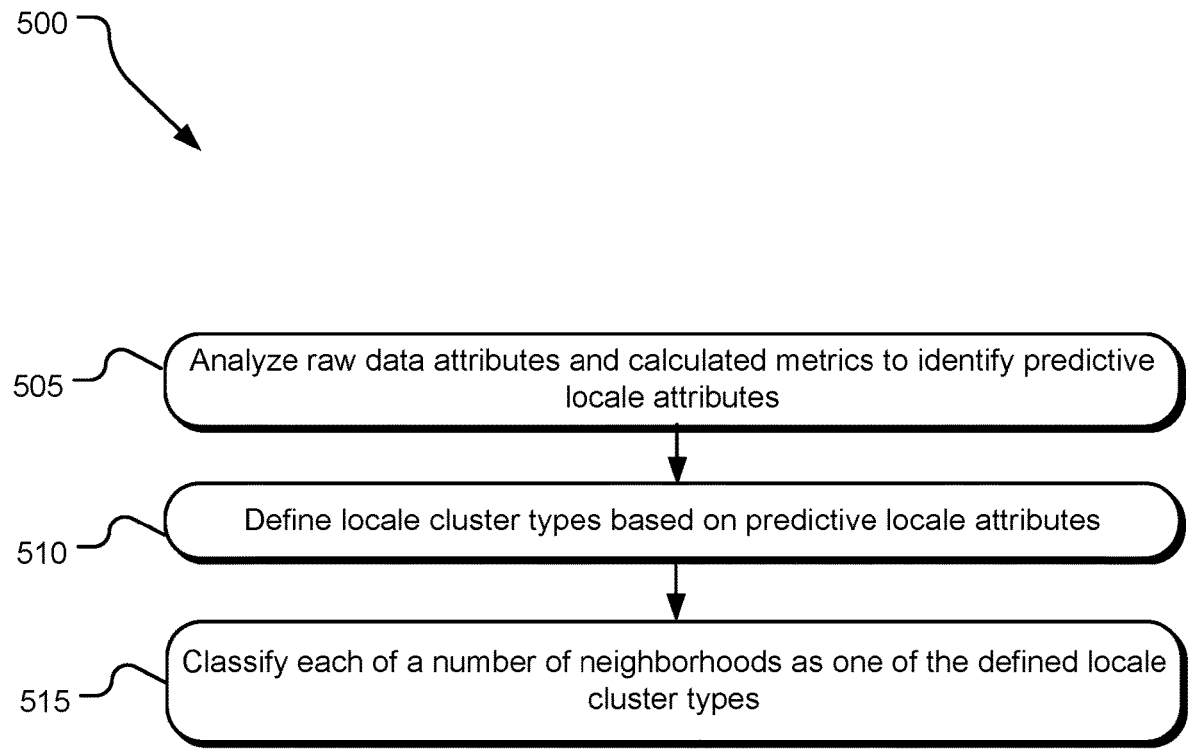
FIG. 5 illustrates example operations for classifying a locale according to one example cluster classification and analysis scheme.

FIG. 5 illustrates example operations 500 for classifying a locale according to a cluster classification and analysis scheme. In general, "clustering" refers to unsupervised learning to determine commonalities within groups using a multi-dimensional analysis. Clustering provides for empirical comparison of naturally different data populations and, in the current application, groups together statistically similar locales.

Using the operations 500, a number of "locale cluster types" are defined based on a distribution of locale attributes corresponding to locales of an input dataset. Collectively, the locale cluster types represent all or a majority of the locales of the input dataset such that each individual locale can be classified as one of the defined locale cluster types. For example, 30 locale cluster types may be defined and each individual locale of the input dataset has a corresponding locale cluster that can be classified as one of the predefined locale cluster types (e.g., Cluster-1 through Cluster-30).

To accomplish the forgoing, an analysis operation 505 first analyzes locale cluster data defining a distribution of locale attributes for a number of different locales. The preliminary analysis operation 505 analyzes the distributions of locale attributes to identify a subset of the locale attributes that are "predictive." A predictive locale attribute is, for example, a feature that helps to distinguish a particular locale cluster from other (e.g., most similar) locale clusters, such as a feature that is likely to vary dramatically between different clusters including clusters with many similar locale attributes. For example, a predictive locale attribute may be represented by a distribution extending over a large range and characterized by an average standard deviation in excess of some predefined threshold.

Each different cluster possesses a unique distribution of these predictive variables. Therefore, the combination of these predictive locale attributes can be used to classify a particular locale (e.g., neighborhood) according to a predefined cluster type classification, such as via the methods described in further detail below. A few exemplary predictive locale attributes are shown in FIG. 6 (discussed in greater detail below).

The analysis operation 505 is performed by way of a comprehensive analysis of raw data attributes and use of calculated metrics from the data. In one example implementation, predictive locale attributes are identified using a variable clustering (e.g., principal component analysis) technique. For example, each of the locales of the input dataset may be represented as an m-dimensional locale cluster, where each dimension of the locale cluster represents a different locale attribute. From each locale cluster, at least one "predictive locale attribute" is identified. For example, a predictive locale attribute may be a variable that is most correlated with other variables within that cluster and least correlated with a next closest cluster (e.g., where "closest" is, for example, measured in terms of Euclidean distance, R-squared, etc.). In one implementation, the locale clusters are subsequently redefined to include the predictive locale attributes and to exclude other locale attributes determined to be non-predictive.

Once predictive locale attributes are identified, a defining operation 510 defines a number of different locale cluster types based on the distribution of locale clusters of the input dataset. According to one implementation, an optimal number of locale cluster types is identified by computing, for each individual locale cluster, a sum of square distances (e.g., distance between a centroid of each locale cluster and each associated locale attribute value). Plotting a sum of square distances curve over all locale attribute distributions allows for identification of sharp bends in the curve useful in determining an optimal number of locale cluster types. More specifically, these "sharp bends" (e.g., local maxima or minima) indicate a number of locale cluster types that allow for mathematical classification of the locales of the dataset into an optimal number of distinctive cluster types. Once the optimal number of cluster types is determined, a corresponding number of locale cluster types may be defined by a centroid and a corresponding distribution of locale attribute values. For example, the centroids may be selected to be equidistant from one another along an axis.

After the different locale cluster types are defined via the defining operation 510, a classification operation 515 classifies each of the locale clusters of the input dataset as one of the defined locale cluster types. In one implementation, this classification is performed according to a Euclidean distance calculation method. For example, distance is calculated from a centroid of a locale cluster representing a particular neighborhood and the centroid of each of the predefined cluster types. The predefined cluster type corresponding to the shortest of the calculated distances is used to classify the particular neighborhood. In some implementations, certain locale attributes are weighted in a predefined manner to influence cluster classification.

In the above-described manner, each locale (e.g., a neighborhood) in an input data set is classified as one of a predefined number of cluster types. This information is saved in one or more databases and used for subsequent locale characterization and comparison, such as to identify similarly classified locales in different geographical regions.

FIG. 6 illustrates exemplary predictive locale attributes 602 with values (not shown) representing an example locale cluster 600. In one implementation, each individual locale (e.g., a neighborhood) can be represented as a locale cluster and further classified as a particular "predefined cluster type." Different clusters and/or different cluster types can be mathematically compared to one another in whole or in part to identify similarities meaningful to a particular user of a system for locale characterization and comparison.

In FIG. 6, each of the example locale attributes 602 is paired with a description 606 and an associated attribute category 604 (e.g., "business type," "demographic," "economic," "housing," "social"). For example, a locale attribute "P_pop_education" is of the attribute category "education" and represents the percentage of population in the associated locale with a specified level of education (e.g., college degree, post-grad degree, etc.). In contrast, a variable: "P_pop_MEY12" is of the attribute category "demographic" and represents the percentage of the population of the associated locale in an age group "old" (e.g., a predefined age range).

In some implementations, a locale cluster may represent a weighting or normalization of certain locale attribute values according to category. For example, a cluster may include economic locale attribute values that are weighted more heavily than demographic attribute values or vice versa. The exemplary predictive locale attributes 602 are non-exclusive and included to provide an overview of some information that may be represented within a locale cluster.

In some implementations, social media information is used as a locale attribute. For example, information from available social media feeds (e.g., Twitter®, Facebook®, etc.) may be aggregated from a certain city and keywords appearing in the user-generated social media may be used to characterize the city. In this sense, locale classification (e.g., according to predefined cluster type) may be based in full or in part on social media information originating from within each locale.

Although not shown in FIG. 6, some locale attributes may also take into account personal information obtained from the user initiating the query. For example, a user may provide information such as education level, income, and sexual preferences and one or more locale attributes especially important to the user in identifying similar locales (e.g., such as the criterion 308 in FIG. 3B). A system for locale characterization and comparison may selectively weight or otherwise utilize predictive locale attributes associated with the personal information to generate a benchmark cluster for subsequent comparison to other locale clusters of locales within a search zone. In other words, user inputs can be used to determine a predefined cluster type that best matches user preferences.

Figures 7A, 7B:
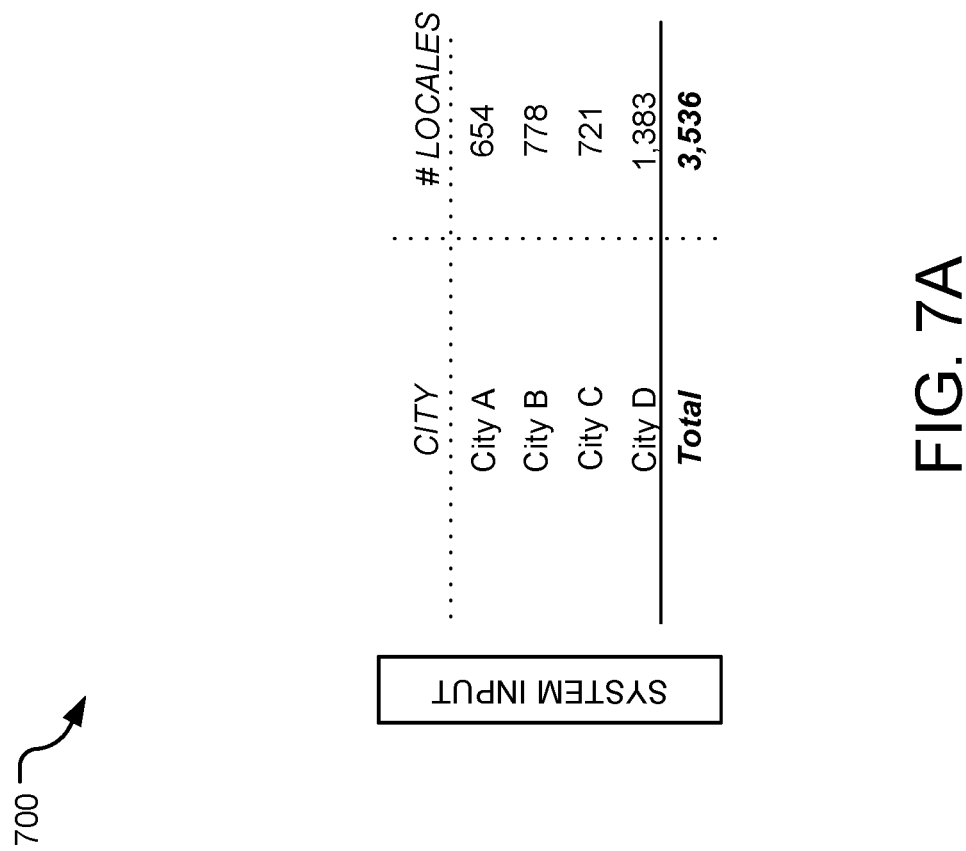
FIG. 7A illustrates example inputs to a system for locale characterization and comparison.
FIG. 7B illustrates example outputs to the system of FIG. 7A.

FIG. 7A illustrates example inputs to a system for locale characterization and comparison 700 (hereinafter the "system 700"). According to one implementation, the system 700 classifies individual locales according to a predefined set of cluster types to provide a meaningful comparison between locales in different geographical areas.

The exemplary inputs to the system 700 include 3,536 locale clusters spanning four different U.S. cities (e.g., City A, City B, City C, City D.). For example, each locale is a different neighborhood. In one implementation, each of the 3,536 locale clusters input to the system 700 is a multi-dimensional distribution of locale attributes. Of the 3,536 input locale clusters, 654 correspond to locales in City A; 778 correspond to locales in City B; 721 correspond to locales in City C; and 1,383 correspond to locales in City D.

FIG. 7B illustrates example outputs to the system 700 including a cluster type classification (e.g., Cluster-1 through Cluster-15) for each of the 3,536 input locale clusters. In one implementation, the various cluster types Cluster-1 through Cluster 15 are defined in the same or similar manner as described with respect to FIG. 5 (e.g., the classification operation 515).

Figures 7C, 7D:
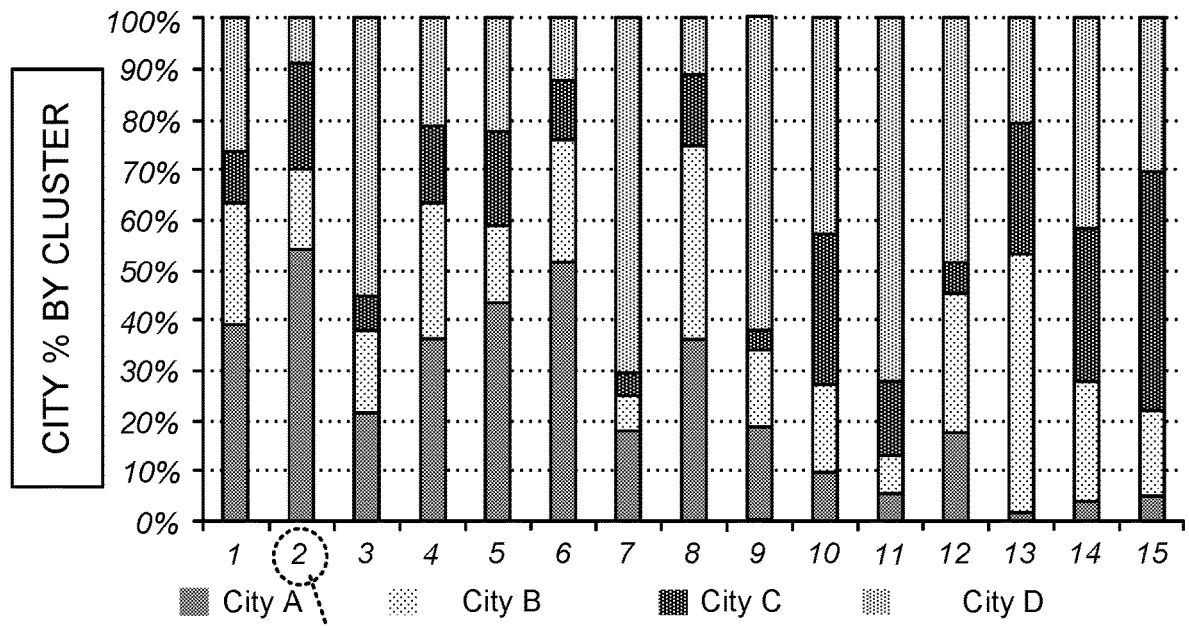
FIG. 7C illustrates a bar graph further illustrating example outputs to the system of FIGS. 7A and 7B.
FIG. 7D illustrates a locale attribute data for an example cluster type depicted on the bar graph of FIG. 7C.

FIG. 7C illustrates a bar graph 702 of example outputs to the system 700. The bar graph 702 enumerates cluster type classifications on the x-axis and a percentage distribution of each cluster type between four different example locales on the y-axis. For example, 54% of the locales classified as Cluster-2 (of the 15 cluster types) are in City A; 16% of the locales classified as Cluster-2 are in City B; 21% of the locales classified as Cluster-2 are in City C; and 9% of the locales classified as Cluster-2 are in City D.

FIG. 7D illustrates cluster information for an example cluster type (e.g., "Cluster-2") in the system 700 depicted on the bar graph of FIG. 7C. In one implementation, each cluster type corresponds to a distribution of locale attributes representing the average values of the corresponding locale clusters. For example, an average of 62% of the population from locales classified as "Cluster-2" are in a certain predefined age group (e.g., "Population in age group old") and recent data indicates that this number is decreasing. Also, an average of 12% of households in locales classified as "Cluster-2" have a particular number of workers contributing to household income (e.g., as represented by the metric "% Households with number of workers"). Other locale attribute values shown in FIG. 7D are mean to be exemplary and are by no means exclusive of the locale attribute values employed or embodied by the exemplified cluster type ("Cluster-2") or by any other cluster type.

By classifying each of the 3,536 input locales according to one of 15 different predefined cluster types (as generally explained above with respect to FIGS. 7A-7D), individual locales in the different 4 cities (City A, City B, City C, and City D) can be compared to one another in a meaningful way. It should be understood that various implementations may employ varying numbers of predefined cluster types less than or greater than the 15 predefined cluster types defined by the system 700.

Figure 8:
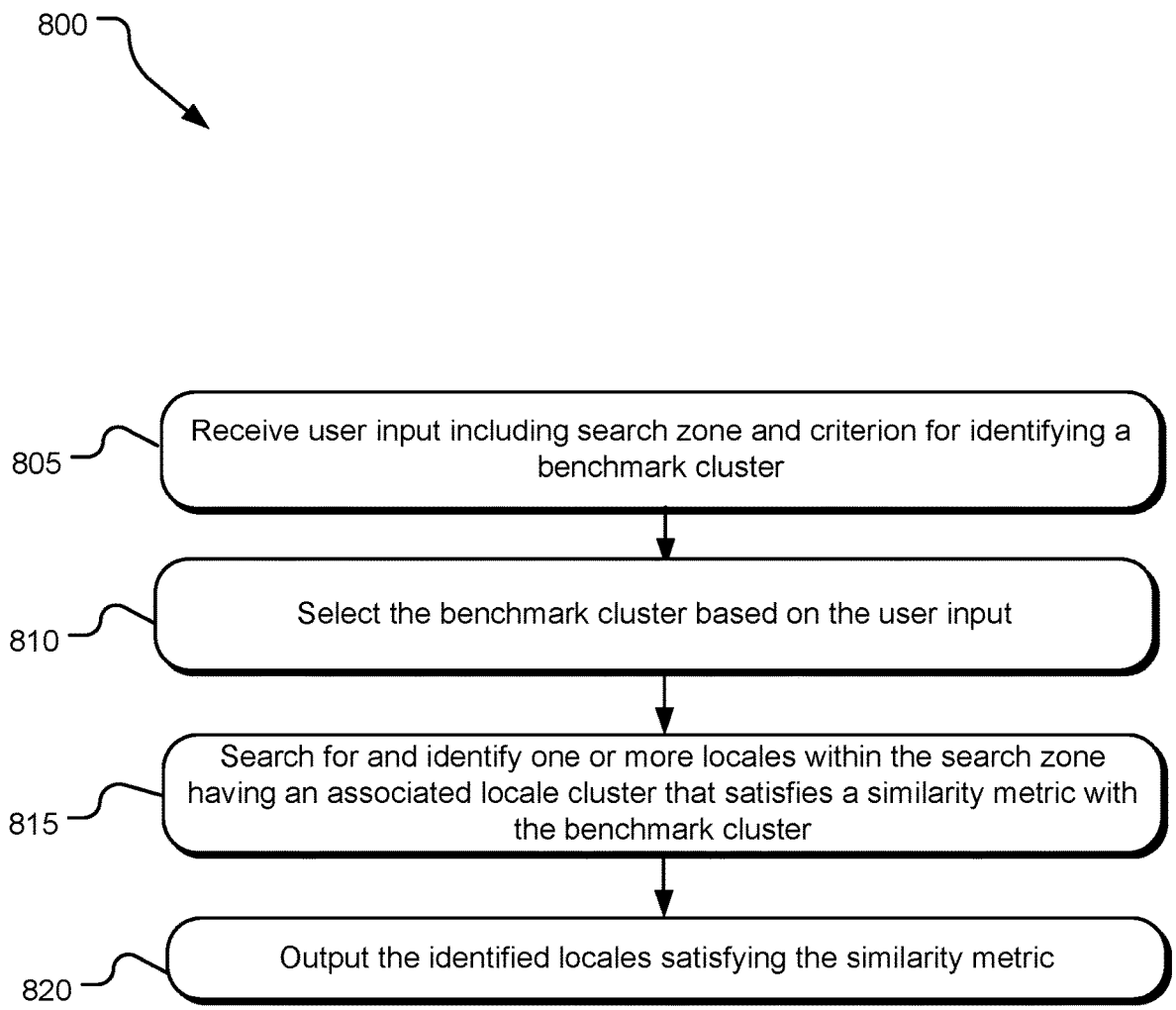
FIG. 8 illustrates example operations for locale characterization and comparison.

FIG. 8 illustrates example operations 800 for locale characterization and comparison. A receiving operation 805 receives user input including a search zone for identifying one or more locales with associated locale clusters similar to a benchmark cluster. In one implementation, the user input includes criterion for defining the benchmark cluster. For example, the user may specify that he or she is looking for a locale with a growing job market, an average income above $75,000, and/or one or more other criterion. In yet other implementations, the user input specifies a benchmark cluster by directly or indirectly selecting a benchmark locale that is saved in association with a particular cluster. For example, the user may specify an address of a residence included in the benchmark locale or otherwise specify a particular locale (e.g., neighborhood, city, state, etc.) to use as the benchmark locale.

A selection operation 810 selects a benchmark cluster based on the user input. In one implementation, the benchmark cluster is an m-dimensional cluster defining a distribution of locale attributes. In the same or another implementation, the benchmark cluster is classified as one of a number of predefined "cluster types," such as a cluster type associated in memory with the identified benchmark locale. For example, the user may specify a neighborhood (e.g., Platte Park in Denver, Colo.) as the benchmark locale. If the specified neighborhood has been previously classified as a particular cluster type (e.g., Cluster-2), the selection operation 810 selects the particular cluster type (e.g., Cluster-2) as the benchmark cluster. In another implementation, the benchmark cluster is dynamically determined based on user input. For example, the user provides one or more criterion of interest and, based on such criterion, the selection operation 810 selects a predefined cluster type to be the benchmark cluster. In still other implementations, the benchmark cluster is selected based on a dynamically computed metric, such as a metric that quantifies a distribution of locale attributes and/or more criterion of interest to a user.

A search and identification operation 815 searches for and identifies one or more locales within the search zone associated with a locale cluster that satisfies a similarity metric with the identified benchmark cluster. For example, the search and identification operation 815 may search for and identify locales within the search zone that are associated in memory with the same cluster type as the benchmark cluster. If, for example, the benchmark cluster is a cluster type identified as "Cluster-4" (e.g., of 'X' different predefined cluster types), the search and identification operation 815 searches for and identifies locales within the search zone that are also classified as Cluster-4. In different implementations, locale classification may be performed according to any of a number of suitable methods including various cluster analysis techniques, Euclidean distance comparisons, R-squared, and/or other statistical comparisons of different locale attribute values, etc.

Some implementations may not utilize predefined "locale cluster types" (e.g., as described with respect to FIG. 5). In one such implementation, the benchmark cluster is computed based on a metric incorporating user input. The similarity metric compares locale attribute values of the benchmark cluster to one or more locale attribute values of locale(s) within the search zone, such as via an R-squared, Euclidean distance or any other suitable comparison metric.

An output operation 820 outputs locales within the search zone that correspond to locale clusters determined to satisfy a similarity metric with the benchmark cluster. In one implementation, the output operation 820 outputs locales within the search zone determined to be "most similar" to the benchmark cluster based on assessment of the similarity metric.

In addition to providing valuable tools for realtors, home seekers, and curious users seeking to compare different geographic regions for other reasons, the above-described locale characterization and comparison systems and methods are also useful in outcome prediction. For example, an event may be predicted in one locale based on observations of the same event in a "similar" locale (e.g., similar according to the characterization and comparison techniques described above). In different implementations, effective predictions can be based on outcome-related correlations inherent in the dataset representing each locale or based on statistical computations using outcome-specific data saved in association with each dataset. In either case, users are provided with a sophisticated tool for assessing a likelihood of observing certain outcomes (e.g., events) in the past, present, or future. A few examples of outcome prediction are provided below with respect to FIGS. 9 and 10.

Figure 9:
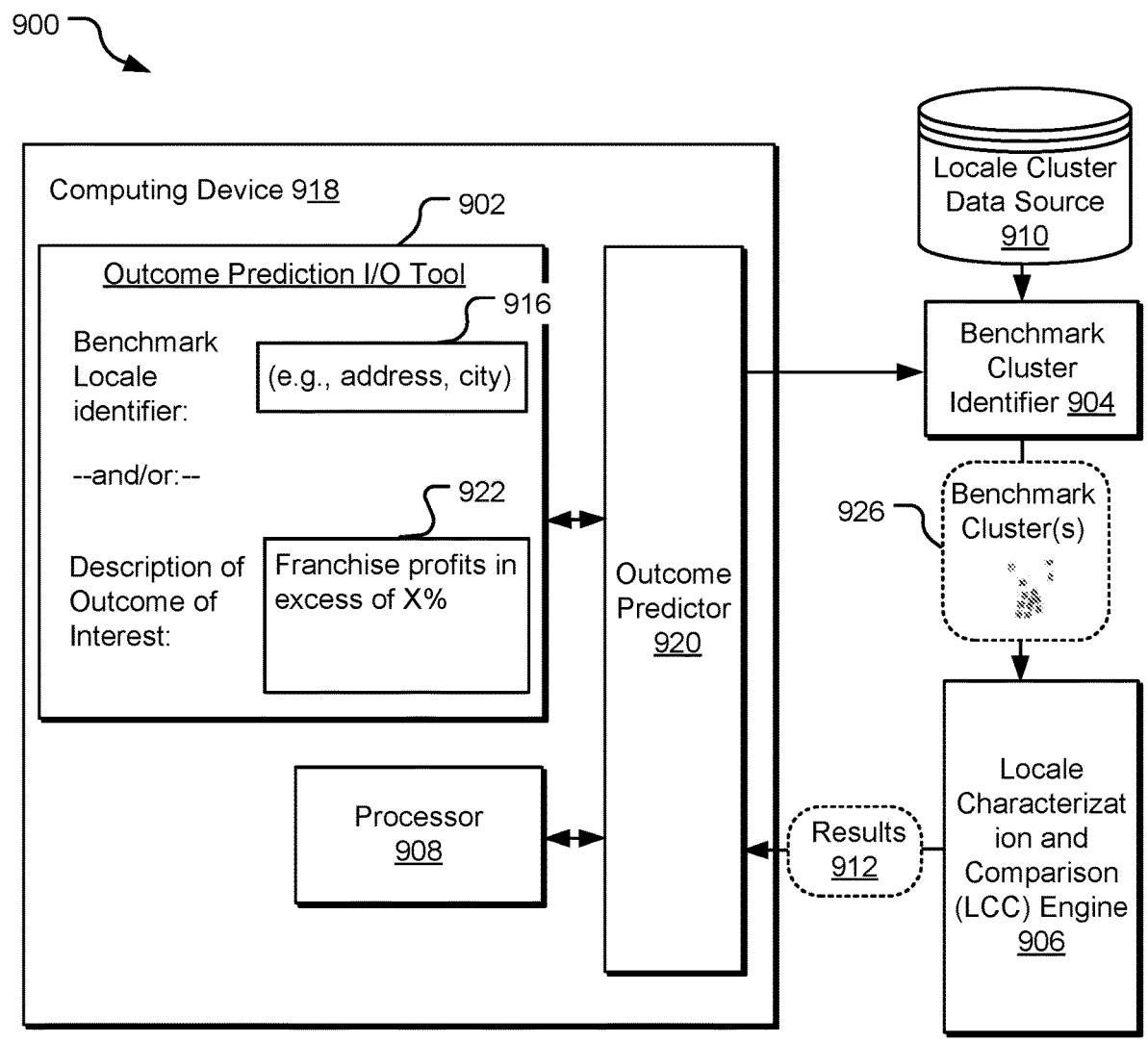
FIG. 9 illustrates one example system for locale-specific outcome prediction based on locale characterization and comparison.

FIG. 9 illustrates one example system 900 for locale-specific outcome prediction based on locale characterization and comparison. The system 900 includes a computing device 918 with a processor 908 for executing various applications and modules, such as an outcome predictor 920. The outcome predictor 920 is communicatively coupled to a benchmark cluster identifier 904 and a locale characterization and comparison (LCC) engine 906. The benchmark cluster identifier 904 and the LCC engine 906 are each stored in memory on a tangible article of manufacture and are executable by a processor to provide locale-specific outcome predictions based on data that is stored in a locale cluster data source 910 in association with a plurality of clusters.

Like the cluster data described elsewhere herein, cluster data stored in the locale cluster data source 910 may include locale attribute values pertaining to a number (e.g., millions) of different geographic locales. In one example implementation, the locale cluster data source 910 stores values for a common set of locale attributes (e.g., hundreds or thousands of different locale attributes) for each of millions of different geographic locales. Locale attributes may include, for example, population statistics based on age, race, gender, job type (e.g., white collar, blue collar), income data, property information, information on the local business market, educational opportunities, social media data, etc. In addition, cluster data stored in the cluster data source 910 or elsewhere may further include data that is derived based on an analysis of locale attributes, such as scoring or other calculations quantifying aspects of different cluster types, attributes, etc.

Different implementations may employ different modeling techniques for comparing clusters based on all or subsets of the stored locale attribute values. In one implementation, predictive attributes are utilized to define cluster types and acoustic modeling techniques are utilized to classify each locale as one of the defined clusters type based on distributions of locale attributes and/or other cluster representations (e.g., as described with respect to FIG. 7A-7D).

In FIG. 9, the benchmark cluster identifier 904 and LCC engine 906 are shown external to the computing device 918; but may, in some implementations, be fully or partially integrated into software and/or hardware of the computing device 918. The outcome predictor 920 accepts user input by way of an outcome prediction I/O tool 902 (e.g., a graphical user interface) and provides such inputs to the benchmark cluster identifier 904 and/or the LCC engine 906. Specific user inputs vary in different implementations.

In general, inputs to the outcome prediction I/O tool 902 provide the outcome predictor 920 with information for identifying at least one benchmark cluster. In one implementation, the benchmark cluster is a cluster corresponding to a geographical locale where an outcome of interest has been observed. As used herein, the term "outcome of interest" refers to an outcome (e.g., an event) capable of being observed (e.g., definitively measured) with respect to a defined geographic locale. The "outcome of interest" may be a desirable or an undesirable outcome. For example, a fast food chain may seek to identify one or more locales (e.g., towns, cities, etc.) where a new franchise location is likely to net high profits (a desirable outcome) or low profits (an undesirable outcome). Alternatively, a real estate developer may seek to identify a percentage of individuals moving into a particular locale within the next year that are likely to spend a certain amount of money on a home (e.g., less than $200,000, between $200,000 and $500,000, greater than $500,000, etc.). The outcome of interest may be directly observable within the corresponding locale (e.g., a number of homes sold in the locale); or, alternatively, the outcome of interest may be observable outside of the locale but be otherwise tied to the locale, such as a consequence of actions taken from within the locale (e.g., the effectiveness of online marketing from within the locale where the marketing targets individuals outside of the locale).

It can be appreciated that clustering and acoustic modeling techniques of the types described elsewhere herein may be useful in predicting countless locale-specific outcomes based on inherent correlations between certain outcomes and stored locale attributes. Other implementations of the disclosed technology may make predictions based in whole or in part upon "outcome data" saved in association with each locale cluster.

By example and without limitation, a few "predictable" locale-specific "outcomes of interest" are listed below:

business net profits within a locale (e.g., net profits above or below a specified threshold);

advertisement response rates within a particular locale (e.g., mail-delivered coupons for a particular department stored see a response rate greater than X %);

application rates for various goods or services (e.g., credit card applications)

contract signatory rates (e.g., a number of individual likely to sign a particular type of contract and/or to sign in accord with specific conditions)

purchase or return rates for particular goods or services;

loan payback or default rates satisfying a particular condition of interest (e.g., number of individuals that made late payments but did not default in the past year);

percentage of customers that remain loyal or disloyal to a provider of goods over a given period of time (e.g., greater than X % of cable customers stayed with a same cable provider for at least 3 years).

As may be appreciated due to the complex and diverse nature of the herein-described clustering datasets and analysis techniques, there exist countless other potential "outcomes of interest" that may be predicted using given geographic locales. An outcome of interest may be satisfied by any number of pre-determined co-existing conditions (e.g., a quantity of sales for a product in a geographic locale v. a quantity of sales for the same product sold to consumers of a certain demographic in the geographic locale v. a quantity of sales for the product sold to consumers of a certain demographic at a certain time of day, etc.)

Specific inputs to the outcome prediction I/O tool may vary widely from one implementation to another. In one implementation, an input to the outcome prediction I/O tool specifically identifies one or more benchmark locales, such as via a benchmark locale identifier 916 shown in FIG. 9. In one implementation, the benchmark locale identifier 916 includes one or more addresses identifying locations where the outcome of interest has been observed. For example, the benchmark locale identifier 916 input to the outcome prediction I/O tool 902 may specify the addresses of three different franchise locations for a corporation that are 'succeeding' by some defined standard (e.g., net profits at given addresses have seen positive increases for 3+ consecutive years). In other implementations, the benchmark locale identifier 916 specifies another geographic identifier such as a city name, state, neighborhood, etc. Still further implementations do not include the benchmark locale identifier 916 as an input.

In some implementations, inputs to the outcome prediction I/O tool 916 may directly or indirectly specify the outcome of interest, as exemplified by data entry field 922. For example, a user may specify a category of the outcome (e.g., business profits, real estate trends, etc.) and/or one or more conditions relating to the selected category. In other implementations, the outcome prediction I/O tool 902 presents the user with a list of potentially-selectable outcomes or outcome 'categories' for prediction along with one or more data entry fields for further specifying conditions usable to identify when the outcome of interest is satisfied. Notably, some implementations of the system 900 may not accept any inputs to the outcome prediction I/O tool 902 that describe the specific outcome of interest.

A description of the outcome of interest (e.g., the data entry field 922) may, if provided as an input to the system 900, be used in various ways, such as by aiding in selection of a similarity metric for performing a comparison. For example, the inputs describing the outcome of interest may be useful in selecting a most-applicable similarity metric, such as a metric that gives more weight to locale attributes known or suspected to implicitly correlate with the outcome of interest or a metric that relies on actual statistical occurrences of the outcome of interest saved in association with various clusters and/or cluster types.

Using inputs such as the exemplary inputs to the outcome prediction I/O tool 902 described above, the benchmark cluster identifier 904 defines a 'benchmark cluster' for a predictive comparison, described below. In one implementation, the benchmark cluster is a cluster stored in the locale cluster data source 910 identified based on the specified benchmark locale identifier 916. For example, the benchmark cluster may be a geographic region including the user-specified address, city name, neighborhood, or other benchmark locale identifier. In the event that the outcome prediction I/O tool 902 receives more than one benchmark locale identifier 916, more than one benchmark locale may be initially identified. For example, inputs may include addresses of the three successful franchise locations that correspond to benchmark locales and corresponding clusters of three different towns.

In other implementations, the "benchmark cluster" is not a cluster stored in the locale cluster data source. For example, the benchmark cluster is a representation of data based on one or more inputs that the user has provided to the outcome prediction I/O tool 902. For example, the benchmark cluster is defined to be any cluster that exhibits the specified outcome of interest or one or more conditions specified via the description of the outcome of interest in the data entry field 922. In one such implementation, the locale cluster data source 910 stores actual outcome data. As used herein, "outcome data" refers to data indicative of actual occurrences of an outcome of interest. In cases where the locale cluster data source 910 stores outcome data, predictions may be based on a similarity metric that compares such outcome data to the user-specified outcome of interest.

The benchmark cluster identifier 926 outputs the one or more identified or defined benchmark clusters 926 to the LCC engine 906, and the LCC engine 906 performs further analysis to generate results 912 identifying one or more geographic locales where the outcome of interest is predicted to be observed. For example, the LCC engine 906 may compare the benchmark cluster 926 to a number of other clusters, such as predefined clusters, dynamically computed clusters, etc., corresponding to other locales saved in the locale cluster data source 910.

The LCC engine 906 may either infer or directly compute a likelihood of the outcome of interest occurring the locales specified in the results 912. In some implementations, the LCC engine 906 infers the existence of correlations between the outcome of interest and one or more locale attributes to predict locales where the outcome of interest is likely to be observed. In this case, the LCC engine may employ a similarity metric that does not rely on any actual outcome data (e.g., statistical occurrences of the actual outcome of interest occurring) when making comparisons, performing analysis, or generating the results 912.

In another implementation making use of inferential predictive analytics, such as that described above, the locale cluster data source 910 may not store any actual outcome data. If, for example, the outcome of interest is "net profits of a fashion retail store in excess of a threshold profit margin," the locale cluster data source 910 may not store any actual values that directly quantify net profits for fashion retail stores. In this example, the LCC engine 906 is adapted to inferentially identify locales where the outcome of interest is likely to occur based on a sophisticated analysis and comparison of locale attribute distributions. For example, the success of fashion retail stores may be inferentially predicted based on age demographics and income data for the corresponding locale. Thus, some models relying on inferential predictive analytics place additional emphasis or 'weighting' on predictive attributes known or suspected to correlate with instances of the outcome of interest.

Still other models relying on inferential predictive analytics make use of comprehensive locale attributes without a tailoring of the similarity metric toward known or suspected correlations. For example, the model described above with respect to FIGS. 7A-7D may classify geographic locales by defining cluster 'types' based on assessments of distributions of thousands of locale attributes for millions of different clusters. If the dataset for each individual cluster is large enough, it may be reasonable to infer that an outcome observed in a locale classified as a particular type of cluster is likely to occur in other locales classified according to a same cluster type. In this case, the LCC engine 906 applies a similarity metric based on cluster type and/or distributions of locale attributions rather than outcome data.

In still other implementations, the LCC engine 906 uses outcome data to directly compute (e.g., rather than inferentially predict) a likelihood of the outcome of interest occurring in one or more geographic locales. For example, the locale cluster data source 910 may, in some implementations, store a classification of individual clusters by cluster type and further store a statistically significant degree of outcome data in association with each different cluster type. The term "statistically significant" has a well-understood mathematical meaning. For example, a significantly significant quantity of outcome data may be a quantity that leads a reasonable investigator to conclude that the specified outcome reasonably represents the characteristics of the corresponding population (e.g., the cluster type) and not just a sampling error.

If outcome data is collected and saved in association with individual clusters, it then becomes possible to mathematically predict the likelihood of an outcome occurring in a locale based on the associated cluster type. If, for example, loan default information is saved in association with each of a number of clusters and the clusters are further classified according to cluster type (e.g., cluster types 1-15, as described above with respect to FIG. 7A-7D), it then becomes possible to predict the likelihood of a loan default occurring in a locale based on the associated cluster type.

In one implementation illustrative of the above example, a user provides the outcome prediction I/O tool 902 with a specific outcome of interest, such as a mortgage default rate in excess of 6%. The user may or may not additionally supply the benchmark locale identifier 916, such as a location where the outcome of interest has been observed. The benchmark cluster identifier 926 defines a benchmark cluster for comparison (e.g., any cluster with associated outcome data indicating a mortgage default rate in excess of 6%). The LCC engine then applies a similarity metric to distributions of clusters stored to identify clusters and/or cluster types most similar to the benchmark cluster. For example, the "similarity metric" may be a metric that quantifies a similarity between the specified outcome of interest and an outcome value stored in association with various clusters and/or cluster types. If stored outcome data indicates that clusters classified as "type B" exhibit, on average, a mortgage default rate of 7%, then the LCC engine 906 may output a list of locales that are classified as type B clusters (e.g., thereby predicting that these locales have or exhibited mortgage default rate in excess of 6% and/or are likely to exhibit similar rates in the future).

After receiving the results 912 from the LCC engine 906, the outcome predictor 920 presents the results to a graphical user interface of the computing device 918 via the outcome prediction I/O tool 902.

Notably, some implementations may make use of further inputs and/or mechanisms for filtering outputs of the LCC engine 906. For example, a user may initially specify a search zone (e.g., as in FIG. 1) that is used to filter outputs of the LCC engine 906. For example, the LCC engine 906 may calculate a similarity metric to identify 127 locales in the United States likely to exhibit an outcome of interest based on inferential correlations or statistical analysis of outcome data. However, the LCC engine 906 may further identify that only 9 of these locales are in the state of California (e.g., a search zone specified by the user). In this case, the LCC engine 906 may output the filtered list including the 9 locales rather than the originally-identified 127 locales.

Figure 10:
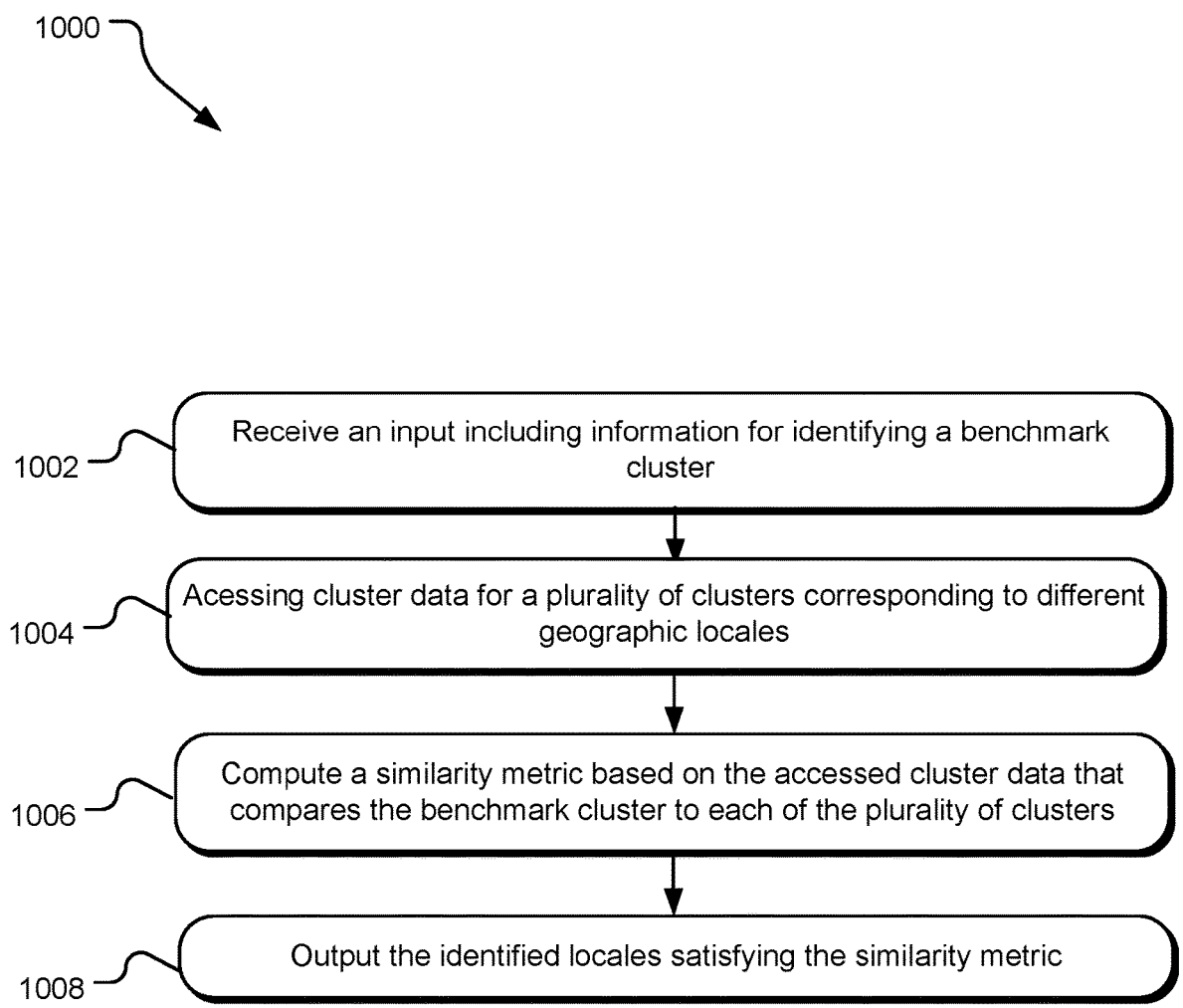
FIG. 10 illustrates example operations for predicting a likelihood of observing an outcome of interest in one or more locales using a locale characterization and comparison scheme.

FIG. 10 illustrates example operations 1000 for predicting a likelihood of observing an outcome of interest in one or more locales using a locale characterization and comparison scheme. A receiving operation 1002 receives an input including information for identifying a benchmark cluster corresponding to a geographic locale where a desired event outcome has been observed. The input may, for example, specify an address, landmark, neighborhood, city, or other geographical descriptor usable to identify a corresponding geographic locale with corresponding cluster data stored in an accessible database. When the input specifies a geographical descriptor (e.g., a benchmark locale identifier 916, as in FIG. 9), a benchmark cluster may be defined as a cluster stored in association with a geographical area including or overlapping an area described by the geographical descriptor. If a geographical descriptor is not included in the input, a benchmark cluster may be defined or identified based on other input. For example, the benchmark cluster may be a null cluster (e.g., any cluster) defined, in whole or in part, by other user inputs, such as locale attribute values, outcome of interest data, etc.

An accessing operation 1004 accesses cluster data for a plurality of clusters corresponding to different geographic locales. In one implementation, the cluster data includes values for a common set of locale attributes defined for each of the plurality of clusters.

A computing operation 1006 computes a similarity metric based on the accessed cluster data. The similarity metric compares the accessed cluster data of each of the plurality of clusters to the benchmark cluster.

In one implementation, the operations 1000 collectively utilize inferential predictive analytics to predict likelihood of an outcome of interest without comparing or contrasting any actual outcome data. For example, the similarity metric may quantify a degree of cluster similarity by comparing locale attributes of the benchmark cluster to locale attributes of the plurality of clusters. The similarity metric applies a threshold to identify clusters that are "most similar," and these most similar clusters are assumed to have a high likelihood of exhibiting similar outcomes. If, for example, an outcome of interest is observed in one locale, the same outcome is likely to be observed in other locales with highly similar locale attributes. Notably, different similarity metrics are employed in different implementations depending on the outcome of interest. For example, the similarity metric may, in some implementations, compare a subset of locale attributes rather than all locale attributes. Alternatively, the similarity metric may increase the influential weight of comparisons between locale attributes predictive locale attributes known or suspected to have a tendency to correlate with the outcome of interest. In other implementations, the similarity metric is not tailored based on known or suspected correlations but instead takes into account a comprehensive comparison of a large number of locale attributes of a variety of types (e.g., as described with respect to FIGS. 7A-7D).

In still another implementation, the operations 1000 make predictions based on statistical analysis of type-classified locale clusters trained with outcome data. For example, locale clusters may be classified according to different cluster types determined based on distributions of predictive locale attributes (e.g., as described above with respect to FIG. 7A-7D), and each cluster type may be further stored in association with a statistically significant amount of outcome data so as to reasonably predict a likelihood of observing a given outcome of interest for each different cluster type. For example, a similarity metric may compare an outcome of interest or conditions of an outcome of interest to distributions of outcome data to determine that, for example, locale clusters classified as cluster type I have a 12% likelihood of observing the outcome of interest, clusters classified as cluster type II have a 6% likelihood of observing the outcome of interest etc. Thus, the similarity metric may be satisfied by one or more clusters determined to have a statistically highest likelihood of observing the outcome of interest.

An output operation 1008 outputs the identified locales corresponding to clusters satisfying the similarity metric. These locales represent geographical regions where the outcome of interest is determined most likely to be observed. Outputs may be filtered, such as based on a user-specified search zone or other filtering criteria.

FIG. 11 discloses a block diagram of a computer system 1100 suitable for implementing one or more aspects of system for locale characterization and comparison. The computer system 1100 is capable of executing a computer program product embodied in a tangible computer-readable storage medium to execute a computer process. Data and program files may be input to the computer system 1100, which reads the files and executes the programs therein using one or more processors. Some of the elements of a computer system 1100 are shown in FIG. 11 wherein a processor 1102 is shown having an input/output (I/O) section 1104, a Central Processing Unit (CPU) 1106, and a memory section 1108. There may be one or more processors 1102, such that the processor 1102 of the computing system 1100 comprises a single central-processing unit 1106, or a plurality of processing units. The processors may be single core or multi-core processors. The computing system 1100 may be a conventional computer, a distributed computer, or any other type of computer. The described technology is optionally implemented in software loaded in memory 1108, a storage unit 1112, and/or communicated via a wired or wireless network link 1114 on a carrier signal (e.g., Ethernet, 3G wireless, 6G wireless, LTE (Long Term Evolution)) thereby transforming the computing system 1100 in FIG. 11 to a special purpose machine for implementing the described operations.

The I/O section 1104 may be connected to one or more user-interface devices (e.g., a keyboard, a touch-screen display unit 1118, etc.) or a storage unit 1112. Computer program products containing mechanisms to effectuate the systems and methods in accordance with the described technology may reside in the memory section 1108 or on the storage unit 1112 of such a computer system 1100.

A communication interface 1124 is capable of connecting the computer system 1100 to a network via the network link 1114, through which the computer system can receive instructions and data embodied in a carrier wave. When used in local area networking (LAN) environment, the computing system 1100 is connected (by wired connection or wirelessly) to a local network through the communication interface 1124, which is one type of communications device. When used in a wide-area-networking (WAN) environment, the computing system 1100 typically includes a modem, a network adapter, or any other type of communications device for establishing communications over the wide area network. In a networked environment, program modules depicted relative to the computing system 1100 or portions thereof, may be stored in a remote memory storage device. It is appreciated that the network connections shown are examples of communications devices for and other means of establishing a communications link between the computers may be used.

In an example implementation, a locale characterization and comparison (LCC) engine 1126 (e.g., the LCC engine 106 or 906 of FIGS. 1 and 9), a benchmark cluster identifier 1128 (e.g., the benchmark cluster identifier 104 or 904 of FIGS. 1 and 9), and an I/O tool 1130 (e.g., the locale comparison I/O tool 102 of FIG. 1 or outcome prediction I/O tool 1102 of FIG. 9) are embodied by instructions stored in memory 1108 and/or the storage unit 1112 and executed by the processor 1102.

One or more relational databases storing cluster data used in comparing different locales may be stored in the disc storage unit 1112 or other storage locations accessible by the computer system 1100. In addition, the computer system 1100 may utilize a variety of online analytical processing tools to mine and process data from the relational databases. Further, local computing systems, remote data sources and/or services, and other associated logic represent firmware, hardware, and/or software, which may be configured to characterize and compare different locales. A locale characterization and comparison engine (LCC) may be implemented using a general purpose computer and specialized software (such as a server executing service software), a special purpose computing system and specialized software (such as a mobile device or network appliance executing service software), or other computing configurations. In addition, modules of the LCC engine may be stored in the memory 1108 and/or the storage unit 1112 and executed by the processor 1102.

The implementations of the invention described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data together with the attached Exhibit provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system for geographic locale outcome prediction, the system comprising:
    store within a database cluster data for a plurality of clusters each representing a different geographic locale and defined by a common set of locale attributes;
    a prediction module stored in memory and executable by a processor, the prediction module configured to:
    access the cluster data for the plurality of clusters, each one of the plurality of clusters being classified in the database by a select one of multiple predefined cluster types, the multiple predefined cluster types being derived in a clustering analysis of the locale attributes for the plurality of clusters and each classifying a subgroup of the multiple clusters having locale attributes with a demonstrated correlation to one another;
    receive an input including information for identifying a benchmark cluster corresponding to a geographic locale where an outcome of interest has been observed, the benchmark cluster being classified in the database by a benchmark cluster type that is one of the multiple predefined cluster types;
    query the database with the benchmark cluster type to identify one or more other geographic locales associated in the database with the benchmark cluster type; and
    output the one or more identified geographic locales, the one or more identified geographic locales representing locales where the outcome of interest is predicted to occur.

2. The system of claim 1, wherein receiving the input includes receiving an address.

3. The system of claim 1, wherein the multiple predefined cluster types are defined based on an assessment of one or more predictive locale attributes identified among the common set of locale attributes, each of the one or more predictive locale attributes characterized by a distribution having a standard deviation in excess of a predetermined threshold.

4. The system of claim 1, wherein the cluster data further includes outcome data for the specified type of event in association with a statistically significant number of the different geographic locales and the processor assesses the similarity metric by quantifying a predictive likelihood of the outcome of interest occurring in each of the plurality of clusters based on the outcome data.

5. One or more non-transitory computer-readable storage media of a tangible article of manufacture encoding computer-executable instructions for executing on a computer system a computer process, the computer process comprising:
    receiving an input including information for identifying a benchmark cluster in a database corresponding to a geographic locale where an outcome of interest has been observed, the benchmark cluster being one of a plurality of clusters defined by a set of locale attributes and associated in the database with a select one of multiple predefined cluster types, the multiple predefined cluster types being derived in a clustering analysis of the locale attributes for the plurality of clusters such that each of the multiple predefined cluster types classifies a subgroup of the plurality of clusters having locale attributes with a demonstrated correlation to one another;
    determining for the benchmark cluster a benchmark cluster type that is one of the multiple predefined cluster types;
    querying the database with the benchmark cluster type to identify one or more other geographic locales associated in the database with the benchmark cluster type; and
    outputting the one or more identified geographic locales, the one or more identified geographic locales representing locales where the outcome of interest is predicted to occur.

6. The one or more non-transitory computer-readable storage media of claim 5, wherein receiving the input includes receiving an address.

7. The one or more non-transitory computer-readable storage media of claim 5, further comprising:
    for each locale attribute of the common set of locale attributes, assessing a distribution of corresponding values in the dataset to identify at least one predictive locale attribute characterized by a distribution having a standard deviation in excess of a predetermined threshold; and
    analyzing one or more distributions of values for the at least one predictive locale attribute to define a number of different cluster types each representing one of the multiple predefined cluster types.

8. The one or more non-transitory computer-readable storage media of claim 7, wherein analyzing the one or more distributions to define a number of different cluster types further comprises:
    computing, for each cluster, a sum of square distances, each of the square distances representing a distance between a centroid of the cluster and one of the locale attributes;
    plotting a curve representing the computed sum of square distances for each cluster;
    identifying local extrema on the plotted curve; and
    defining each local extrema as a different cluster type.

9. The one or more non-transitory computer-readable storage media of claim 8, further comprising:
   classifying each of the plurality of clusters as one of the multiple predefined cluster types.

10. The one or more non-transitory computer-readable storage media of claim 5, wherein the cluster data further includes outcome data for the specified type of event in association with a statistically significant number of the different geographic locales and identifying the one or more other geographic locales further comprises quantifying a predictive likelihood of the outcome of interest occurring in each of the plurality of clusters based on the outcome data.

11. One or more non-transitory computer-readable storage media of a tangible article of manufacture encoding computer-executable instructions for executing on a computer system a computer process, the computer process comprising:
   receiving an input including information for identifying a benchmark cluster in a database corresponding to a geographic locale associated with an observed outcome of interest, the benchmark cluster being one of a plurality of clusters defined by a set of locale attributes and associated in the database with a select one of multiple predefined cluster types, the multiple predefined cluster types being derived in a clustering analysis of the locale attributes for the plurality of clusters such that each of the multiple predefined cluster types classifies a subgroup of the plurality of clusters having locale attributes with a demonstrated correlation to one another;
   determining for the benchmark cluster a benchmark cluster type that is one of the multiple predefined cluster types;
   querying the database with the benchmark cluster type to identify one or more geographic locales associated in the database in association with the benchmark cluster type; and
   outputting the one or more identified geographic locales, the one or more identified geographic locales representing locales where the outcome of interest is predicted to occur.

* * * * *